United States Patent
Hiraide

(10) Patent No.: US 9,523,855 B2
(45) Date of Patent: Dec. 20, 2016

(54) VIRTUAL IMAGE DISPLAY APPARATUS

(71) Applicant: SEIKO EPSON CORPORATION, Tokyo (JP)

(72) Inventor: Noriaki Hiraide, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/568,884

(22) Filed: Dec. 12, 2014

(65) Prior Publication Data
US 2015/0185477 A1 Jul. 2, 2015

(30) Foreign Application Priority Data
Dec. 26, 2013 (JP) ................................. 2013-268721

(51) Int. Cl.
 *G09G 5/00* (2006.01)
 *G02B 27/01* (2006.01)
 *G02B 6/00* (2006.01)

(52) U.S. Cl.
 CPC .............. *G02B 27/017* (2013.01); *G02B 6/00* (2013.01); *G02B 27/0172* (2013.01); *G02B 2027/0161* (2013.01); *G02B 2027/0178* (2013.01)

(58) Field of Classification Search
 CPC ..... G02B 27/017; G02B 27/0172; G02B 6/00; G02B 2027/0161; G02B 2027/0178
 See application file for complete search history.

(56) References Cited

U.S. PATENT DOCUMENTS

| | | | | |
|---|---|---|---|---|
| 8,666,212 B1 * | 3/2014 | Amirparviz | ............. | G02B 6/00 385/115 |
| 2004/0085649 A1 * | 5/2004 | Repetto | ............. | G02B 27/0172 359/633 |
| 2012/0069448 A1 * | 3/2012 | Sugihara | ............ | G02B 27/0176 359/643 |
| 2012/0200935 A1 * | 8/2012 | Miyao | ................ | G02B 27/0172 359/630 |
| 2012/0206817 A1 * | 8/2012 | Totani | ................ | G02B 27/0172 359/633 |
| 2012/0243102 A1 * | 9/2012 | Takeda | ................. | G02B 17/086 359/630 |
| 2013/0222896 A1 | 8/2013 | Komatsu et al. | | |
| 2013/0278497 A1 * | 10/2013 | Takagi | .................. | G06F 3/012 345/156 |

FOREIGN PATENT DOCUMENTS

JP A-2013-200553 10/2013

* cited by examiner

*Primary Examiner* — Andrew Sasinowski
*Assistant Examiner* — Gerald Oliver
(74) *Attorney, Agent, or Firm* — Oliff PLC

(57) ABSTRACT

A virtual image display apparatus includes a video image display element which generates video image light and a light guiding member which includes a plurality of optical surfaces and guides the video image light by reflecting on an inner surface side. The light guiding member is a block-shaped member including, as a plurality of optical surfaces, a pair of facing planes which extend substantially in parallel with each other and fully reflect the video image. The light guiding member includes a pair of side portions interposing the pair of facing planes in a direction vertical to a light guiding direction. At least one side portion of the pair of side portions couples the pair of facing planes by a flat plane including a tapered surface which is adjacent to the one plane of the pair of facing planes and forms an obtuse angle.

14 Claims, 9 Drawing Sheets

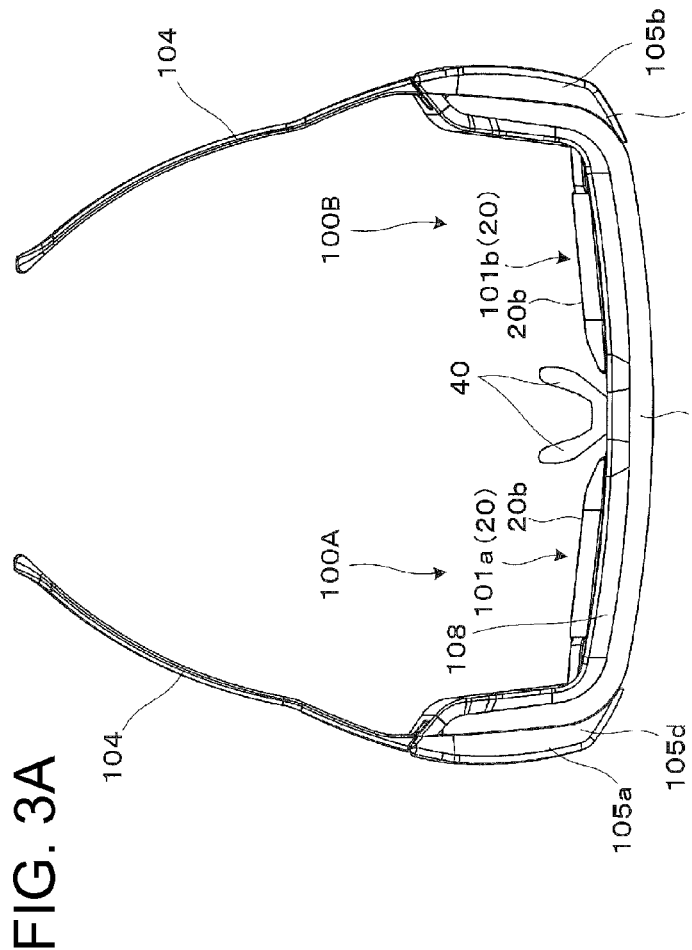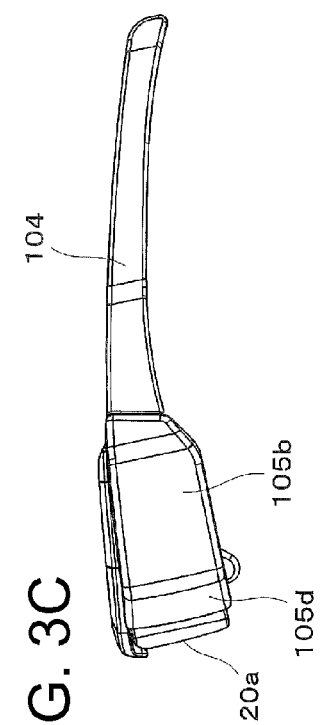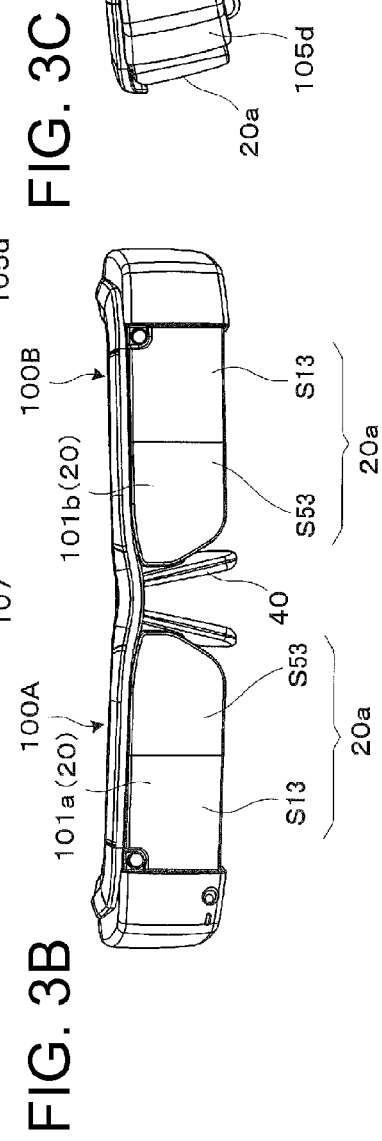

VIRTUAL IMAGE DISPLAY APPARATUS

BACKGROUND

1. Technical Field

The present invention relates to a virtual image display apparatus which presents a video image formed by an image display element and the like to a viewer, and particularly to a virtual image display apparatus which is preferably applied to a head mount display designed to be mounted on the head of the viewer.

2. Related Art

Various optical systems to be embedded in a virtual image display apparatus such as a head mount display (hereinafter, also referred to as an HMD) designed to be mounted on the head of a viewer have been proposed. For example, an optical system which uses a prism member configured of a relatively thick light guiding member arranged in front of the eyes and a light transmitting member joined to the tip end side of the light guiding member to display a virtual image and enable viewing of an external image has been known (see JP-A-2013-200553, for example).

According to the virtual image display apparatus which uses the prism member as described above, it is considered that a rib is provided in a periphery between a pair of facing main optical surfaces in the light guiding member and the like for convenience in aligning the optical surfaces or for a reason of a molding process. By providing such a rib, it is possible to easily align both the light guiding member and the light transmitting member during assembly for joining the light guiding member and the light transmitting member and to cause the rib to function as a guide for assembling the prism member, to which the light guiding member and the light transmitting member are joined, with another member. In addition, it is possible to facilitate separation of the light guiding member during injection molding or the like of the light guiding member by using the rib.

However, since the prism member configures an appearance of the virtual image display apparatus, there is a possibility that a necessity to hide or remove the aforementioned rib occurs. In addition, the shape including the rib brings about a complicated outer shape, and there is a possibility that design for the appearance is inevitably restricted.

SUMMARY

An advantage of some aspects of the invention is to provide a virtual image display apparatus, for which formation of a rib or the like with an influence on an appearance is suppressed and a degree of freedom in designing the appearance is enhanced.

An aspect of the invention is directed to a virtual image display apparatus including: a video image element which generates video image light; and a light guiding member which includes a plurality of optical surfaces and guides the video image light from the video image element by reflecting the video image light by inner surfaces, in which the light guiding member is a member which includes, as the plurality of optical surfaces, a pair of facing planes arranged substantially in parallel with each other and fully reflecting the video image light, in which the light guiding member includes a pair of side portions interposing the pair of facing planes from a direction vertical to a light guiding direction in which the video image light is guided, and in which at least one side portion of the pair of side portions includes a tapered surface which is adjacent to one of the pair of facing planes and forms an obtuse angle.

According to the virtual image display apparatus, since the at least one side portion of the pair of side portions includes the tapered surface, which is adjacent to the one plane of the pair of facing planes and forms the obtuse angle, and couples the pair of facing planes, it is possible to form the one side portion to have a shape with no portion which affects the appearance, such as a rib, to omit post-processing of removing the rib, and to enhance a degree of freedom in designing the appearance. In addition, since the light guiding member includes, as the plurality of optical surfaces, the pair of facing planes which extend substantially in parallel with each other and fully reflect the video image light, it is possible to obtain a diopter scale of substantially zero with respect to external light which transmits through the light guiding member and is then viewed, and particularly, it is possible to obtain an appearance magnification error of substantially zero for an external image and to obtain a state close to a naked eye state, by arranging the planes in front of the eyes.

In another aspect of the invention, the one side portion couples the pair of facing planes by a flat surface including the tapered surface. In such a case, the one side portion of the light guiding member has a smooth shape, the appearance of the light guiding member is simplified, and the light guiding member can be easily downsized.

In still another aspect of the invention, the one side portion includes a flat band-shaped coupling surface between the tapered surface and the other surface of the pair of facing planes. In such a case, it is also possible to provide an angle between the tapered surface and the coupling surface. A boundary between the tapered surface and the coupling surface can correspond to a mold splitting surface in a case of forming the light guiding member by injection molding, for example.

In yet another aspect of the invention, the light guiding member extends in a thin and elongated shape in the light guiding direction, and the tapered surface at the one side portion also extends in a thin and elongated shape in the light guiding direction. In such a case, the tapered surface configures a side surface of the light guiding member in the longitudinal direction, and exposure of one side surface of the light guiding member in the longitudinal direction is facilitated.

In still yet another aspect of the invention, the band-shaped coupling surface is adjacent to the other plane of the pair of facing planes and forms an obtuse angle.

In further another aspect of the invention, the other side portion of the pair of side portions includes a tapered surface which is adjacent to the one plane of the pair of facing planes and forms an obtuse angle, and a rib which is formed and projected on the side closer to the other plane of the pair of facing planes than to the tapered surface. In this case, the other side portion of the pair of side portions can be assembled with another member, can be aligned with another member, or can be used as a mechanism portion by providing the rib.

In still further another aspect of the invention, the virtual image display apparatus further includes a frame portion which supports the light guiding member in front of the eyes, and the rib is fitted into a groove which is provided in the frame portion. In this case, it is possible to stably hold the light guiding member with respect to the frame portion.

In yet further another aspect of the invention, the pair of tapered surfaces provided at the pair of side portions form an angle from 91° to 135° with respect to the one plane.

In still yet further another aspect of the invention, the light guiding member includes a light incident surface, from which the video image light from the video image element is taken, at one end in the light guiding direction and emits the video image light from the one plane of the pair of facing planes. In this case, it is possible to form the light guiding member into a shape to be interposed on the video image light emitting side, and which makes the appearance of the tapered surface unnoticeable.

In a further aspect of the invention, the light guiding member includes four or more surfaces as the plurality of optical surfaces, the video image light from the video image element is fully reflected by a third surface as the other plane of the pair of facing planes, is fully reflected by a first surface as the one plane of the pair of facing planes, is reflected by a second surface, then transmits through the first surface, and reaches a viewing side. In such a case, it is possible to arrange the light incident surface at a position which is relatively separate from the second surface.

In a sill further aspect of the invention, the virtual image display apparatus furthers include: a light transmitting member which causes a viewer to visually recognize external light and the video image light in an overlapped manner by being attached to the second surface of the light guiding member. In such a case, it is possible to configure a see-through-type optical system which overlaps the video image light and the external light.

BRIEF DESCRIPTION OF THE DRAWINGS

The invention will be described with reference to the accompanying drawings, wherein like numbers reference like elements.

FIG. 3A is a planar view showing the appearance of the virtual image display apparatus, FIG. 3B is a front view thereof, and FIG. 3C is a side view thereof.

DESCRIPTION OF EXEMPLARY EMBODIMENTS

Hereinafter, a detailed description of an embodiment of a virtual image display apparatus according to the invention with reference to FIG. 1 and the like is provided.

Figure 1:
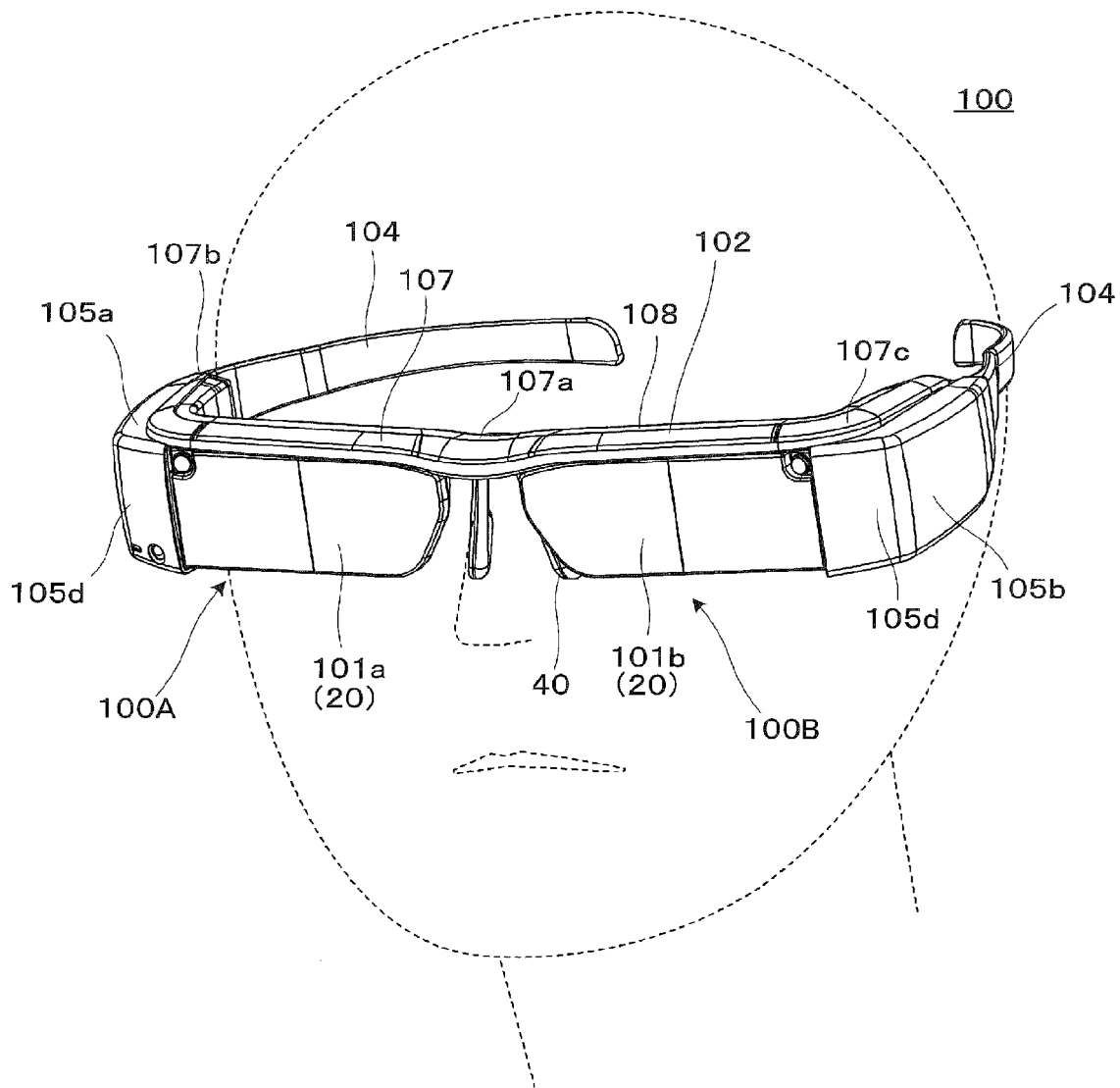
FIG. 1 is a perspective view illustrating an appearance of a virtual image display apparatus according to an embodiment of the invention.

As shown in FIG. 1, a virtual image display apparatus 100, which includes a light guiding device, according to the embodiment is a head mount display with an appearance similar to glasses, can cause a viewer or a user who wears the virtual image display apparatus 100 to visually recognize image light (video image light) by a virtual image, and can cause the viewer to visually recognize or view an external image in a see-through manner. The virtual image display apparatus 100 is provided with first and second optical members 101a and 101b which cover the front of the eyes of the viewer while providing visualization, a frame portion 102 which supports both the optical members 101a and 101b, and first and second image formation main body portions 105a and 105b which are added to portions from both ends of the frame portion 102 in the left-right direction to temples 104 on the rear side. Here, a first display device 100A as a combination of the first optical member 101a and the first image formation main body portion 105a on the left side in the drawing is a portion where a virtual image for the right eye is formed, and the first display device 100A also functions alone as a virtual image display apparatus. In addition, a second display device 100B as a combination of the second optical member 101b and the second image formation main body portion 105b on the right side in the drawing is a portion where a virtual image for the left eye is formed, and the second display device 100B also functions alone as a virtual image display apparatus.

Figure 2:
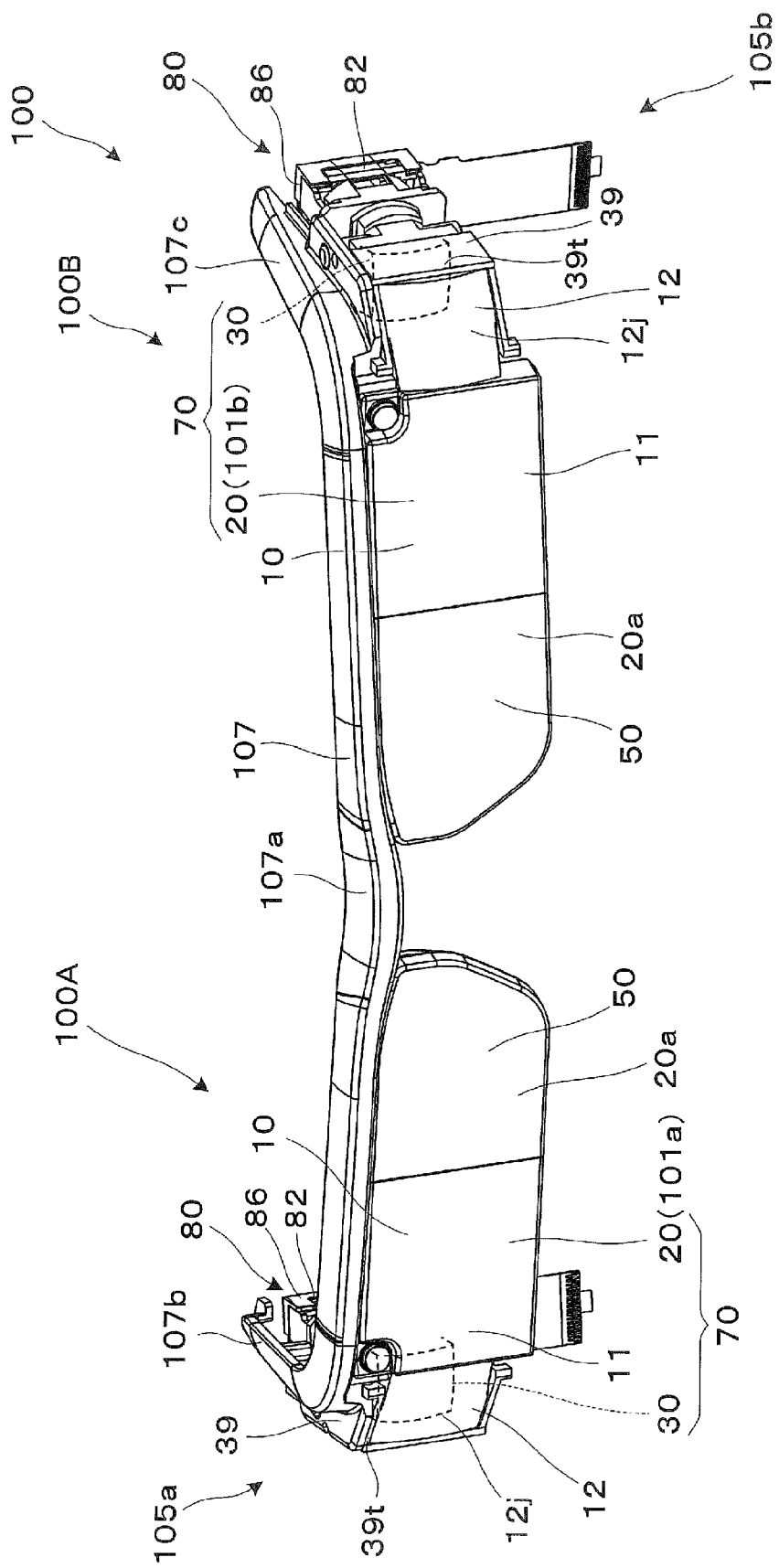
FIG. 2 is a perspective view showing an internal structure of the virtual image display apparatus from which external accessory members are removed.
Figure 4:
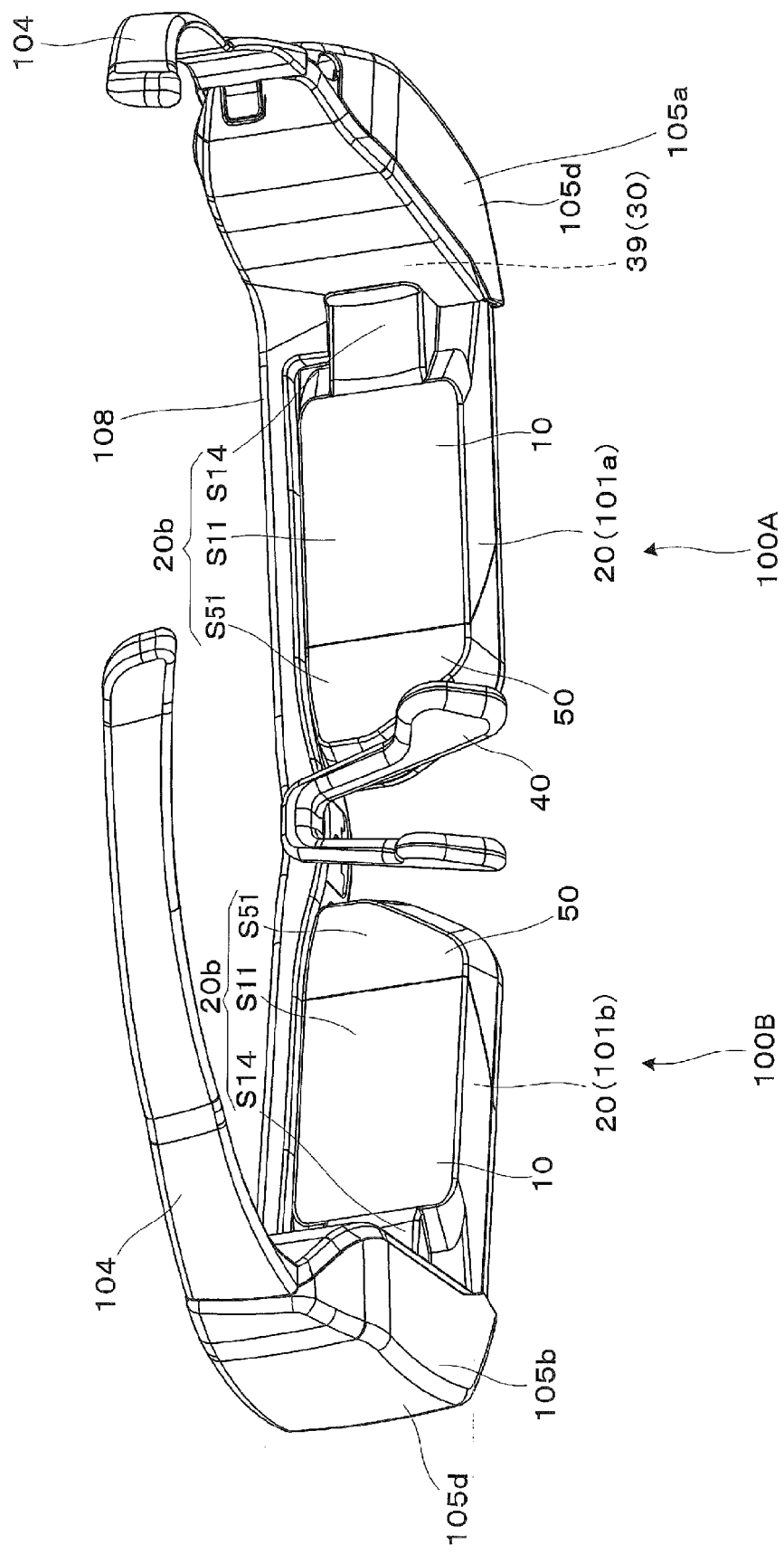
FIG. 4 is a perspective view of the appearance of the virtual image display apparatus shown from another angle.

FIG. 2 shows an internal structure of the virtual image display apparatus 100, and the appearance and the inside of the virtual image display apparatus 100 can be compared by comparison of FIG. 2 with FIG. 1. For example, each of the first and second image formation main body portions 105a and 105b is configured of an image display device 80 which includes a projector lens 30 accommodated in a lens barrel portion 39 and a video image display element (video image element) 82.

As shown in the respective drawings from FIG. 1 to FIG. 4 of the appearance and the inside thereof, the frame portion 102 provided in the virtual image display apparatus 100 is provided with a frame 107 arranged on an upper end side and a resin portion 108 which is arranged along the frame 107 on the rear side thereof. In addition, the virtual image display apparatus 100 has a configuration in which a frame-shaped portion is not provided on the lower side. The frame 107 which configures the frame portion 102 is a thin and long plate-shaped member which is curved in a U shape and is provided with a front portion 107a which extends in the left-right traverse direction as a direction corresponding to the alignment of the eyes of the viewer and a pair of side portions 107b and 107c which extend in a depth direction as a direction corresponding to the front and the back of the viewer. The frame 107, namely the front portion 107a and the side portions 107b and 107c are a metal integrated component which is formed of a metal material such as die cast aluminum. The resin portion 108 is arranged along the frame 107 and cooperates with the frame 107 by being fitted to the frame 107 so as to be able to accommodate various cables and the like for image formation, for example. In the frame 107, the width of the front portion 107a and the resin portion 108 in the depth direction is substantially the same as the thickness or the width of the light guiding device 20 corresponding to the first and second optical members 101a and 101b. On the left side of the frame 107, specifically, at a portion from the left end portion of the front portion 107a when viewed from a front direction of the virtual image display device to the side portion 107b, the first optical member 101a and the first image formation main body portion 105a are aligned and supported by being directly fixed by screwing, for example. On the right side of the frame 107, specifically, at a portion from the right end portion of the front portion 107a when viewed from a front direction of the virtual image display device to the side portion 107c, the second optical member 101b and the second image formation main body portion 105b are aligned and supported by being directly fixed by screwing, for example. In addition, the first optical member 101a and the first image formation main body portion 105a are aligned so as to be fit to each other, and the second optical member 101b and the second image formation main body portion 105b are aligned so as to be fit to each other.

The frame 107 and the resin portion 108 which configure the frame portion 102 support the first and second image formation main body portions 105a and 105b and also play a role in protecting the insides of the first and second image formation main body portions 105a and 105b by cooperation with a cover-shaped external accessory member 105d which covers the first and second image formation main body portions 105a and 105b. In addition, the frame 107 is separated from or in loose contact with an upper portion except for a root side of the first and second optical members 101a and 101b or the light guiding devices 20, which are coupled to the first and second image formation main body portions 105a and 105b. For this reason, even if there is a difference in thermal coefficients between the light guiding devices 20 at the center and the frame portion 102 including the frame 107, expansion of the light guiding devices 20 in the frame portion 102 is allowed, and it is possible to prevent strain, deformation, and breakage from occurring in the light guiding device 20.

A nose receiving portion 40 is additionally provided in the frame portion 102. The nose receiving portion 40 plays a role in supporting the frame portion 102 by abutting on the nose of the viewer. That is, the frame portion 102 is arranged in front of the face of the viewer by the nose receiving portion 40 supported at the nose and the pair of temples 104 supported at the ears. The nose receiving portion 40 is fixed by screwing at the front portion 107a of the frame 107 which is one of the members configuring the frame portion 102. In addition, the appearance shown with reference to FIG. 1 is an example, and designs for portions which are not directly involved in the optical mechanism, such as a mechanism for fixing screws, can be appropriately changed.

As shown in FIG. 2 and the like, it is possible to understand that the first display device 100A is provided with a perspective projection device 70 as an optical system for projection and an image display device 80 which forms video image light. The perspective projection device 70 plays a role in projecting an image formed by the image display device 80 as a virtual image to the eyes of the viewer. The perspective projection device 70 is provided with a first optical member 101a or the light guiding device 20 and the projector lens 30 for image formation. The first optical member 101a or the light guiding device 20 are configured of a light guiding member 10 for light guiding and visualization and a light transmitting member 50 for visualization. In addition, the first image formation main body portion 105a is configured of the image display device 80 and the projector lens 30. The projector lens 30 which is configured of a group of lenses is accommodated in the lens barrel portion 39 and is fixed at an end portion 39t of the lens barrel portion 39 in a state of being precisely positioned by fitting with respect to the light guiding device 20 as will be described in detail later.

The image display device 80 includes a video image display element (video image element) 82 as a transmissive space light modulation device, an illumination device (not shown) as a backlight which emits illumination light to the video image display element 82, and a drive control unit (not shown) which controls operations of the video image display element 82 and the like as will be described in detail later. The video image display element 82 is accommodated in a video image element case 86 and assembled with the lens barrel portion 39, which accommodates the projector lens 30 for image formation, via the video image element case 86. In other words, the lens barrel portion 39 is a coupling member which couples the video image display element 82, the projector lens 30, the light guiding device 20, and the like.

The light guiding device 20 is a block-shaped member which is configured of the light guiding member 10 for light guiding and visualization and the light transmitting member 50 for visualization as described above. The light guiding member 10 is a part of the prism-type light guiding device 20 and an integrated member, and can be separately understood as a first light guiding portion 11 on the light outgoing side and a second light guiding portion 12 on the light incident side. The light transmitting member 50 is a member which assists the visualization function of the light guiding member 10 and forms a light guiding device 20 by being integrally fixed to the light guiding member 10. By fitting a projection-shaped tip end portion 12j of the light guiding device 20 with the aforementioned configuration, which is positioned on the light source side (root side) to the end portion 39t of the lens barrel portion 39, the light guiding device 20 is precisely positioned with respect to the projector lens 30 and is fixed thereto.

Here, a first exposed surface 20a as a front (outside) exposed surface and a second exposed surface 20b as a rear (inside) exposed surface among the optical surfaces which configure the light guiding device 20 are portions which are exposed to the outside and have an influence on the see-through function as shown in FIGS. 3A to 3C and 4, for example. In addition, the first exposed surface 20a is configured of a third surface S13 from among the optical surfaces of the light guiding member 10 and a third transmitting surface S53 as an optical surface of the light transmitting member 50, and the second exposed surface 20b is configured of a first surface S11 and a fourth surface S14 from among the optical surfaces of the light guiding member 10 and a first transmitting surface S51 from among the optical surfaces of the light transmitting member 50 as shown in the drawing.

Figure 5:
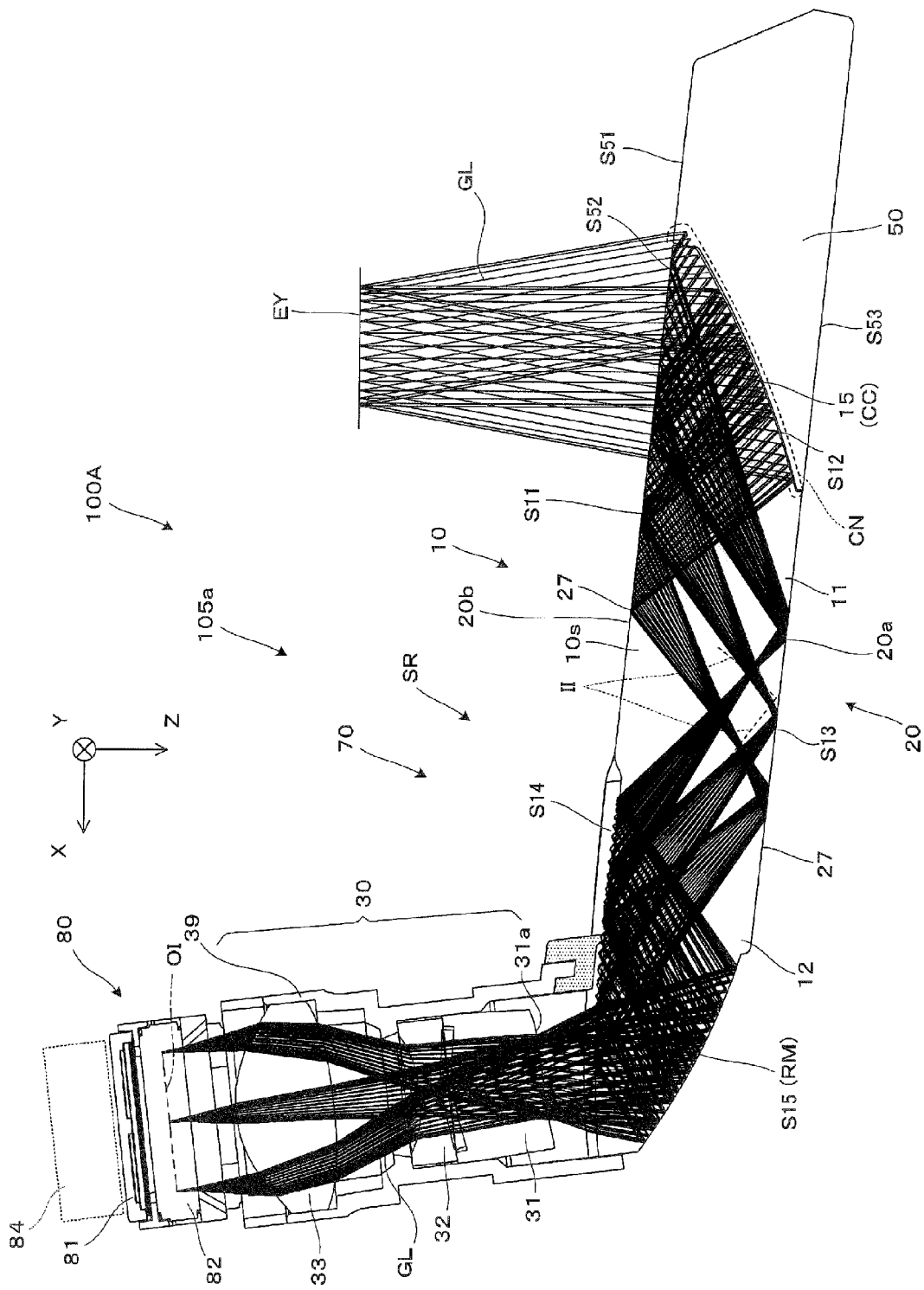
FIG. 5 is a cross-sectional view of a main body portion, which configures the virtual image display apparatus, in a plan view.
Figure 6:
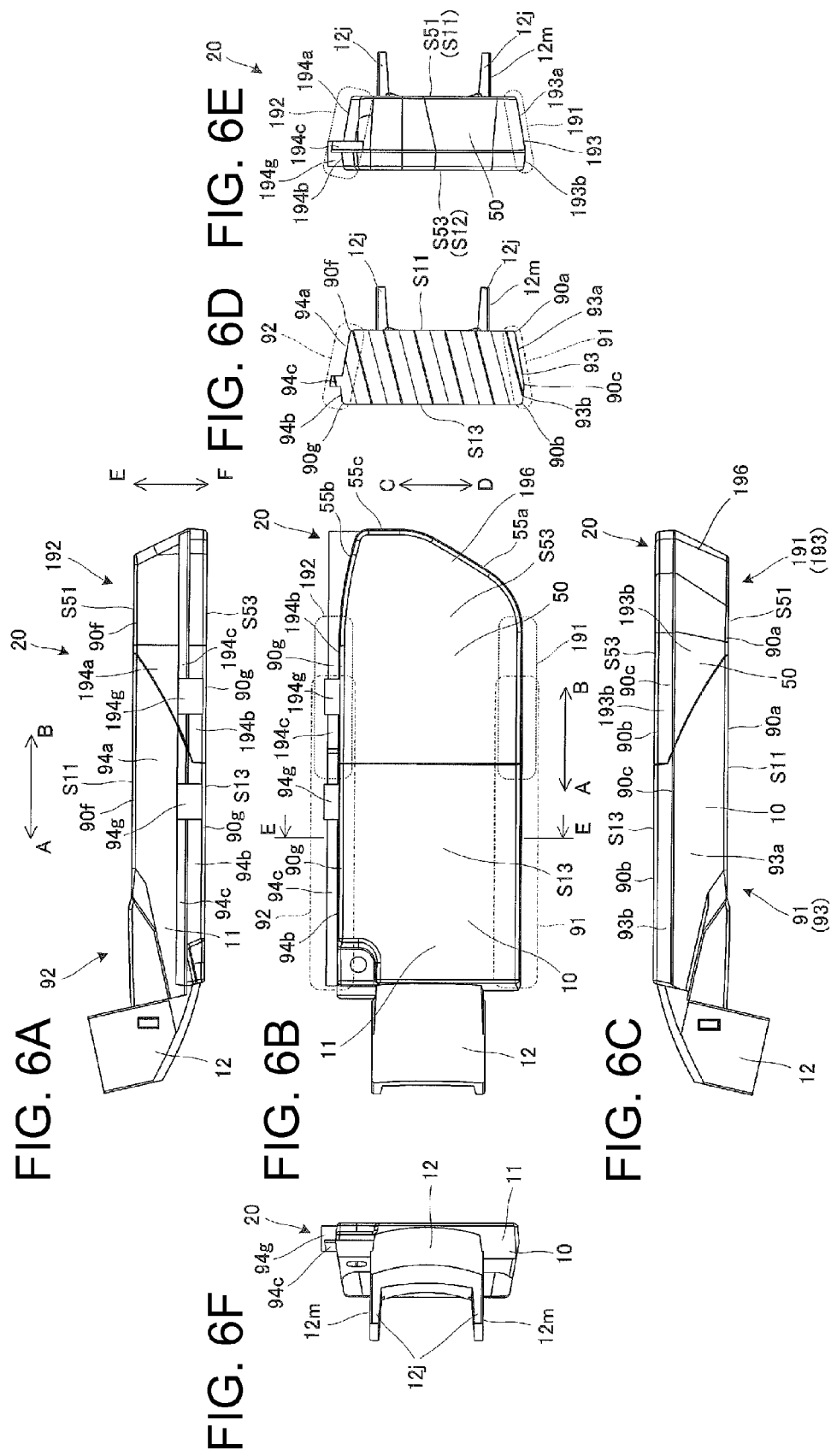
FIGS. 6A to 6F are a planar view, a front view, a bottom view, a cross-sectional view from the arrow EE, a left end surface view, and a right end surface view of a prism member including a light guiding member.
Figure 7:
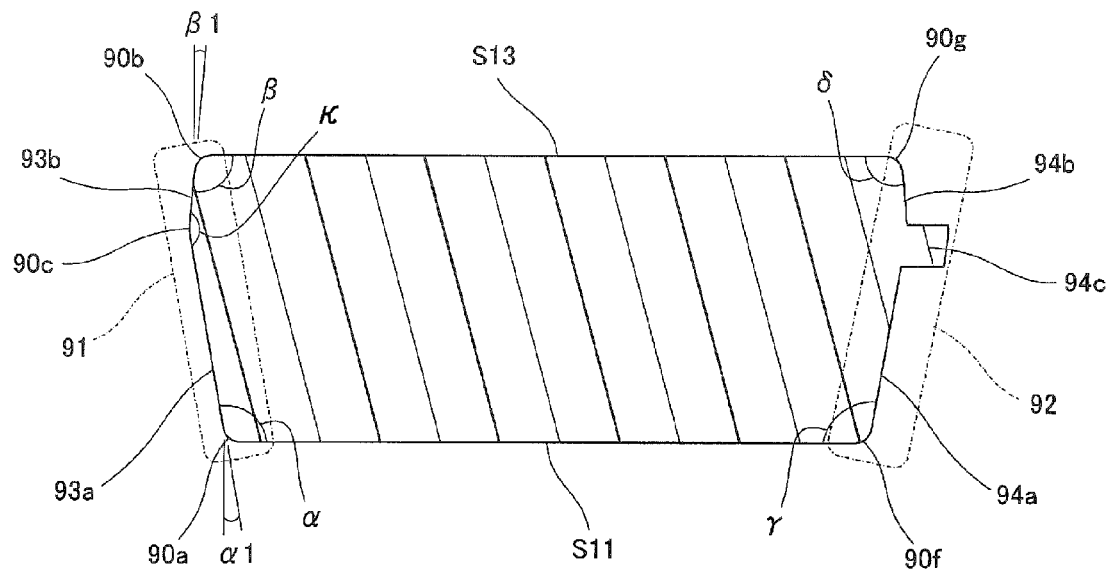
FIG. 7 is an enlarged view illustrating a cross-sectional shape of the light guiding member.

Hereinafter, a detailed description will be given of the image display device 80 and the projector lens 30 which configure the first image formation main body portion 105a (see FIG. 1) with reference to FIG. 5.

The image display device 80 includes an illumination device 81 which emits illumination light to the video image display element 82 and a drive control unit 84 which controls operations of the illumination device 81 and the video image display element 82 in addition to the aforementioned video image display element 82.

The illumination device 81 of the image display device 80 includes a light source which generates light including three colors, namely red, green, and blue and a backlight guiding portion which disperses the light from the light source and forms a light flux with a rectangular cross section. The video image display element (video image element) 82 is formed of a liquid crystal display device, for example, is configured of a plurality of pixels, and forms image light as a display target, such as a moving image, by spatially modulating the illumination light from the illumination device 81. The drive control unit 84 is configured of a light source drive circuit which supplies power to the illumination device 81 and causes the illumination device 81 to emit illumination light with stable luminance and a liquid crystal drive circuit which forms color video image light or image light as a transmittance pattern which functions as a source of a moving image or a stationary image by outputting an image signal or a drive signal to the video image display element (video image element) 82 although not shown in the drawing. In addition, it is possible to provide an image processing function to the liquid crystal drive circuit, or alternatively, it is also possible to provide the image processing function to an external control circuit.

The projector lens 30 is a projection optical system which includes, as constituent elements, three optical elements (lenses) 31 to 33 along an optical axis on the incident light side, and is supported by the lens barrel portion 39 accommodating these optical elements 31 to 33. Each of the optical elements 31 to 33 is an aspherical lens including both a non-axisymmetric aspherical surface and an axisymmetric aspherical surface, and cooperates with a part of the light guiding member 10 to form an intermediate image, which corresponds to a display image of the video image display element 82, inside the light guiding member 10. In the respective lenses (optical elements) 31 to 33, a lens surface 31a as a light outgoing surface of the first lens 31 is a non-axisymmetric aspherical surface, and lens surfaces other than the lens surface 31a are axisymmetric aspherical surfaces.

Hereinafter, a detailed description will be given of the light guiding device 20 and the like. As described above, the light guiding device 20 is configured of the light guiding member 10 and the light transmitting member 50. Among the light guiding member 10 and the light transmitting member 50, the light guiding member 10 has a portion, which linearly extends, on the center side (in front of the eyes) close to the nose in a plan view. The first light guiding portion 11, which is arranged on the center side close to the nose, namely on the light outgoing side, in the light guiding member 10 includes, as surfaces with optical functions, a first surface S11, a second surface S12, and a third surface S13. The second light guiding portion 12 which is arranged on a peripheral side separated from the nose, namely on the light incident side includes, as surfaces with optical functions, a fourth surface S14 and a fifth surface S15. Among the surfaces, the first surface S11 and the fourth surface S14 are continuously adjacent to each other, and the third surface S13 and the fifth surface S15 are continuously adjacent to each other. In addition, the second surface S12 is arranged between the first surface S11 and the third surface S13, and the fourth surface S14 and the fifth surface S15 are adjacent to each other at a large angle. Furthermore, the first surface S11 and the third surface S13 which are arranged so as to face each other have substantially parallel planar shapes here. In contrast, the other surfaces with the optical functions, namely the second surface S12, the fourth surface S14, and the fifth surface S15 are non-axisymmetric spherical surfaces (free spherical surfaces).

Here, the surfaces S14 and S15 other than the first surface S11 to the third surface S13 from among the plurality of surfaces which configure the light guiding member 10 include at least one point with different curvature symbols depending on directions in at least one free spherical surface. With such a configuration, it is possible to precisely control the guiding of the video image light and to reduce the size of the light guiding member 10.

In the light guiding device 20, the light guiding member 10 is joined to the light transmitting member 50 via an adhesive layer CC, and a portion which is configured of a joining surface between the light guiding member 10 and the light transmitting member 50 and the adhesive layer CC corresponds to the joining portion CN. In addition, the light guiding device 20 is formed by joining a base material of the light guiding member 10 and the light transmitting member 50 at the joining portion CN and coating the joined base material by dipping processing. That is, the hard coating layer 27 of the light guiding member 10 is provided to the light transmitting member 50 and the entirety of the light guiding device 20.

A main body 10s of the light guiding member 10 is formed of a resin material which has a high light transmitting property in a visible region and is molded by injecting and solidifying thermoplastic resin in a mold, for example. As a material of the main body 10s, it is possible to use cycloolefin polymer, for example. Although the main body 10s is formed as an integrally formed article, the light guiding member 10 can be considered by being functionally divided into the first light guiding portion 11 and the second light guiding portion 12 as described above. The first light guiding portion 11 enables wave guiding and emission of video image light GL and enables visualization of external light HL. The second light guiding portion 12 enables incidence and wave guiding of the video image light GL.

In the first light guiding portion 11, the first surface S11 is an optical surface which functions as a refraction surface for emitting the video image light GL to the outside of the first light guiding portion 11 and also functions as a full reflective surface for fully reflecting the video image light GL on the inner surface side. The first surface S11 is arranged in front of the eyes EY and has a planar shape as described above. In addition, the first surface S11 is a surface formed of the hard coating layer 27 provided on the surface of the main body 10s.

The second surface S12 is a surface of the main body 10s, is an optical surface which includes a half mirror layer 15 additionally provided thereon, and is a non-axisymmetric aspherical surface. The half mirror layer 15 is a reflective film with a light transmitting property (that is, a semi-transmitting reflective film). The half mirror layer (semi-transmitting reflective film) 15 is formed on a partial region (omitted in the drawing), which is obtained by narrowing the second surface S12 in the vertical direction along the Y axis, instead of the entirety of the second surface 12. The half mirror layer 15 is formed by forming a metal reflective film or a dielectric body multilayered film on the partial region PA on a base coating surface of the main body 10s. A reflection rate of the half mirror layer 15 with respect to the video image light GL is equal to or greater than 10% and equal to or less than 50% in a range of the assumed incident angle of the video image light GL in terms of facilitation of viewing the external light HL by the see-through property. A reflection rate of the half mirror layer 15 according to a specific embodiment with respect to the video image light GL is set to 20%, for example, and transmittance thereof with respect to the video image light GL is set to 80%, for example.

The third surface S13 is an optical surface which functions as a full reflective surface which fully reflects the video image light GL on the inner surface side. The third surface S13 is arranged substantially in front of the eyes EY, has a planar shape in the same manner as the first surface S11, has a diopeter scale of 0 when the external light HL is viewed by causing the external light HL to pass through the first surface S11 and the third surface S13, by the configuration in which the first surface S11 and the third surface S13 are mutually parallel surfaces, and does not particularly cause any variable power. In addition, the third surface S13 is a surface formed by the hard coating layer 27 which is provided on the surface of the main body 10s.

In the second light guiding portion 12, the fourth surface S14 is an optical surface which functions as a full reflective surface which fully reflects the video image light GL on the inner surface side, and is a non-axisymmetric aspherical surface. The fourth surface S14 also functions as a reflective surface which causes the video image light GL to be incident on the inside of the second light guiding portion 12. That is, the fourth surface S14 functions both as a light incident surface which causes the video image light GL to be incident on the light guiding member 10 from the outside and as a reflective surface which delivers the video image light GL inside the light guiding member 10. In addition, the fourth surface S14 (light incident surface) is a surface which is formed by the hard coating layer 27 which is provided on the surface of the main body 10s.

In the second light guiding portion 12, the fifth surface S15 is an optical surface which is formed by forming a light reflective film RM formed of an inorganic material on the surface of the main body 10s. The fifth surface S15 is a non-axisymmetric aspherical surface which functions as a reflective surface.

The light transmitting member 50 forms one light guiding device 20 which is integrally fixed to the light guiding member 10 as described above and is a member (assistant optical block) which assists the visualization function of the light guiding member 10. The light transmitting member 50 includes the first transmitting surface S51, the second transmitting surface S52, and the third transmitting surface S53 as side surfaces with optical functions. Here, the second transmitting surface S52 is arranged between the first transmitting surface S51 and the third transmitting surface S53. The first transmitting surface S51 is on a plane obtained by extending the first surface S11 of the light guiding member 10, the second transmitting surface S52 is a spherical surface which is joined to and integrated with the second surface S12 with the adhesive layer CC, and the third transmitting surface S53 is on a plane obtained by extending the third surface S13 of the light guiding member 10. Among the surfaces, the second transmitting surface S52 and the second surface S12 of the light guiding member 10 are integrated by being joined via the thin adhesive layer CC and thus have shapes with substantially the same curvature.

The light transmitting member 50 has a high light transmitting property in the visible region, and a main body portion of the light transmitting member 50 is formed of a thermoplastic resin material with substantially the same refractive index as that of the main body 10s of the light guiding member 10. In addition, the light transmitting member 50 has the main body portion with the surface on which the hard coating layer 27 is provided in the same manner as the light guiding member 10. The first transmitting surface S51 and the third transmitting surface S53 are surfaces which are formed by the hard coating layer 27 provided on the surface of the main body portion.

According to the embodiment, the video image light from the video image display element 82 is guided in the light guiding member 10 by reflection performed five times from the first surface S11 to the fifth surface S15 including the second surface S12 as a non-axisymmetric aspherical surface. In addition, the light guiding device 20 which covers the front of the eyes as a whole includes, as the first exposed surface 20a, the third surface S13 and the third transmitting surface S53, includes, as the second exposed surface 20b, the first surface S11 and the first transmitting surface S51, which are parallel to the third surface S13 and the third transmitting surface S53, and includes the built-in half mirror layer 15 along the second surface S12. As a result, it is possible to achieve both the display of the video image light GL and the see-through function for causing the viewer to visually recognize the external light HL and to correct aberration of the video image light GL in the light guiding member 10.

Hereinafter, a specific description will be given of an optical path of the video image light GL and the like in the virtual image display apparatus 100 with reference to FIG. 5. The video image light GL emitted from the video image display element (video image element) 82 is converged by being made to pass through the respective lenses 31 to 33 which configure the projector lens 30, a prescribed astigmatism is applied thereto, and the video image light GL is then incident on the fourth surface S14 with a positive refractive power which is provided to the light guiding member 10. In addition, the astigmatism is offset while the video image light GL passes through the respective surfaces of the light guiding member 10, and the video image light is finally emitted in a state corresponding to the initial display toward the eyes of the viewer.

The video image light GL after being incident on and passing through the fourth surface S14 of the light guiding member 10 advances while being converged, is reflected by the fifth surface S15 with a relatively weak positive refractive power when passing through the second light guiding portion 12, is incident again on the fourth surface S14 from the inside, and is reflected by the fourth surface S14.

The video image light GL reflected by the fourth surface S14 of the second light guiding portion 12 is incident on and fully reflected by the third surface S13, which has substantially no refractive power, at the first light guiding portion 11, and is incident on and fully reflected by the first surface S11 which has substantially no refractive power. The video image light GL forms an intermediate image in the light guiding member 10 before or after passing through the third surface S13. An image plane II of the intermediate image corresponds to an image plane OI of the video image display element 82.

The video image light GL which is fully reflected by the first surface S11 is incident on the second surface S12. However, the video image light GL which is incident on the half mirror layer 15, in particular, partially transmits through the half mirror layer 15, is partially reflected by the half mirror layer 15, and is incident on and transmits through the first surface S11 again. In addition, the half mirror layer 15 acts on the video image light GL reflected by the half mirror layer 15 as a half mirror layer with a relatively strong positive refractive power. In addition, the first surface S11 acts on the video image light GL which passes through the first surface S11 as a surface with no refractive power.

The video image light GL which passes through the first surface S11 is incident on pupils of the eyes EY of the viewer or on an equivalent position thereof as substantially parallel light flux. That is, the viewer views an image formed on the video image display element (video image element) 82 by the video image light GL as a virtual image.

In contrast, a part of the external light HL, which is incident on the further +X side than the second surface S12 of the light guiding member 10 passes through the third surface S13 and the first surface S11 of the first light guiding portion 11. However, substantially no aberration occurs at this time since the third surface S13 and the first surface S11 are substantially parallel planes. That is, the viewer views an external image through the light guiding member 10 with no strain. Similarly, a part of the external light HL, which is incident on the further −X side than the second surface S12 of the light guiding member 10, that is, the part which is incident on the light transmitting member 50 does not cause aberration when passing through the third transmitting surface S53 and the first transmitting surface S51 provided at the light transmitting member 50 since the third transmitting surface S53 and the first transmitting surface S51 are substantially parallel planes. That is, the viewer views the external image through the light transmitting member 50 with no strain. Furthermore, apart of the external light HL, which is incident on the light transmitting member 50 corresponding to the second surface S12 of the light guiding member 10, does not substantially cause aberration when passing through the third transmitting surface S53 and the first surface S11 since the third transmitting surface S53 and the first surface S11 are substantially parallel planes. That is, the viewer views the external image through the light transmitting member 50 with less strain. In addition, both the second surface S12 of the light guiding member 10 and the second transmitting surface S52 of the light transmitting member 50 have substantially the same spherical shapes and have substantially the same refractive index, and a gap therebetween is filled with the adhesive layer CC with substantially the same refractive index. That is, the second surface S12 of the light guiding member and the second transmitting surface S52 of the light transmitting member 50 do not act as refractive surfaces of the external light HL.

However, the external light HL which is incident on the half mirror layer 15 partially transmits through the half mirror layer 15 and is partially reflected by the half mirror layer 15. Therefore, the external light HL from a direction corresponding to the half mirror layer 15 is weakened at the transmittance of the half mirror layer 15. In contrast, since the video image light GL is incident from the direction corresponding to the half mirror layer 15, the viewer views both the image formed on the video image display element (video image element) 82 and the external image in the direction of the half mirror layer 15.

A part, which is not reflected by the half mirror layer 15, of the video image light GL which is delivered in the light guiding member 10 and is incident on the second surface S12 is incident on the light transmitting member 50. However, the part of the video image light GL is prevented from returning to the light guiding member 10 by a reflection preventing portion which is provided in the light transmitting member 50 and is not shown in the drawing. That is, the video image light GL which passes through the second surface S12 is prevented from returning to the optical path and becoming stray light. In addition, the external light HL which is incident from the side of the light transmitting member 50 and is reflected by the half mirror layer 15 is returned to the light transmitting member 50. However, the external light HL is prevented from being emitted to the light guiding member 10 by providing the reflection preventing portion. That is, the external light HL reflected by the half mirror layer 15 is prevented from returning to the optical path and becoming stray light.

Hereinafter, a description will be given of the outer shape of the light guiding device 20 including the light guiding member 10 with reference to FIGS. 6A to 6F and 7. The light guiding member 10 is a block-shaped member and includes a pair of side portions 91 and 92 which interposes the first surface S11 and the third surface S13 in a vertical CD direction orthogonal to the light guiding direction in which the video image light is guided as a whole, namely an AB direction.

The first side portion 91 of the pair of side portions 91 and 92 includes a flat surface 93 and couples the first and third surfaces S11 and S13, which are a pair of facing planes, from the lower side by the flat surface 93. The flat surface 93 includes a flat tapered surface 93a which is adjacent to the one first surface S11 and forms an obtuse angle close to a right angle and a flat band-shaped coupling surface 93b which is adjacent to the third surface S13 on the other side and forms an obtuse angle close to the right angle. The tapered surface 93a and the coupling surface 93b extend to have thin and long shapes in the AB direction corresponding to the light guiding direction in the same manner as the light guiding member 10. The tapered surface 93a forms an obtuse angle α from 91° to 135° with respect to the first surface S11, more preferably forms an obtuse angle α from 93° to 110°, and specifically forms an angle of about 100°. Here, it is desirable that an inclination angle of the tapered surface 93a be set such that a draft angle α1 is equal to or greater than 1° or equal to or greater than 3° in consideration of separation from a mold and be set to be equal to or less than 45° or equal to or less than 20° from the viewpoint of preventing an increase in size of a projection which affects the appearance. That is, it is desirable that the obtuse angle α be set to be equal to or greater than 91° or equal to or greater than 93° and equal to or less than 135° or 110°.

In contrast, the coupling surface 93b also forms an obtuse angle β from 91° to 135° with respect to the third surface S13, more preferably forms an obtuse angle β from 93° to 110°, and specifically forms an angle of about 95°. That is, a draft angle β1 of the coupling surface 93b is within a range from 1° to 45° and is preferably within a range from 3° to 20°. The tapered surface 93a and the coupling surface 93b according to a specific embodiment form a small angle κ of about 15° as a result, and the tapered surface 93a has a width which is several times as large as the width of the coupling surface 93b. With such a configuration, the flat surface 93 forms a flat appearance with a small amount of unevenness as a whole. A border line portion 90a between the first surface S11 and the tapered surface 93a, a border line portion 90b between the third surface S13 and the coupling surface 93b, and the border line portion 90c between the tapered surface 93a and the coupling surface 93b linearly extend in the AB direction. These border line portions 90a, 90b, and 90c have small widths in a direction orthogonal to the AB direction in practice, and particularly, the border line portions 90a and 90b form R planes with arc cross sections, and the remaining border line portion 90c forms a plane which is in parallel with an EF direction.

The second side portion 92, which is located on the upper side, of the pair of side portions 91 and 92 couples the first and third surfaces S11 and S13 from the upper side. The second side portion 92 includes a flat tapered surface 94a which is adjacent to the first surface S11 and forms an obtuse angle close to the right angle, a flat coupling surface 94b which is adjacent to the third surface S13 and forms an obtuse angle close to the right angle, and a rib 94c which projects between the tapered surface 94a and the coupling surface 94b. The tapered surface 94a, the coupling surface 94b, and the rib 94c extend in a thin and long shape in the AB direction corresponding to the light guiding direction in the same manner as the light guiding member 10. The tapered surface 94a forms an obtuse angle γ from 91° to 135° with respect to the first surface S11, more preferably forms an obtuse angle γ from 93° to 110°, and specifically forms an angle of about 100°. In contrast, the coupling surface 94b also forms an obtuse angle γ from 91° to 135° with respect to the third surface S13, more preferably forms an obtuse angle γ from 93° to 110°, and specifically forms an angle of about 95°. The coupling surface 94b also forms an obtuse angle γ from 91° to 135° with respect to the third surface S13, more preferably forms an obtuse angle δ from 93° to 110°, and specifically forms an angle of about 95°. The rib 94c interposed therebetween projects in the CD direction from the coupling surface 94b. The rib 94c has a uniform width and a uniform height as a whole while the rib 94c is provided with a thick gate portion 94g at a location. The gate portion 94g is a trace of resin injection for molding the light guiding member 10. The border line portion 90f between the first surface S11 and the tapered surface 94a and the border line portion 90g between the third surface S13 and the coupling surface 94b linearly extend in the AB direction. The border line portions 90f and 90g have small widths in a direction orthogonal to the AB direction in practice and form R surfaces with arc cross sections.

The light transmitting member 50 is provided with a pair of facing side portions 191 and 192 and a tip end portion 196 which is provided on the tip end side and connects the side portions 191 and 192. The first side portion 191, which is located on the lower side, of the pair of side portions 191 and 192 includes a flat surface 193, and the first and third transmitting surfaces S51 and S53 as a pair of facing planes are coupled to each other by the flat surface 193. The flat surface 193 of the light transmitting member 50 is obtained by extending the flat surface 93 of the light guiding member 10 and extends in the AB direction. The flat surface 193 includes a flat tapered surface 193a which is adjacent to the first transmitting surface S51 and forms an obtuse angle close to the right angle and a flat band-shaped coupling surface 193b which is adjacent to the third transmitting surface S53 and forms an obtuse angle close to the right angle. A border line portion 90a between the first transmitting surface S51 and the tapered surface 193a, a border line portion 90b between the third transmitting surface S53 and the coupling surface 193b, and a border line portion 90c between the tapered surface 193a and the coupling surface 193b linearly extend in the AB direction. The border line portions 90a, 90b, and 90c have small widths in the direction orthogonal to the AB direction in practice in the same manner as the light guiding member 10, and particularly, the border line portions 90a and 90b form R planes with arc cross sections, and the remaining border line portion 90c forms a plane which is in parallel with the EF direction.

The second side portion 192, which is located on the upper side, of the pair of side portions 191 and 192 couples the first and third transmitting surfaces S51 and S53 from the upper side. The second side portion 192 includes a flat tapered surface 194a which is adjacent to the first transmitting surface S51 and forms an obtuse angle close to the right angle, a flat coupling surface 194b which is adjacent to the third transmitting surface S53 and forms an obtuse angle close to the right angle, and a rib 194c which projects from a position between the tapered surface 194a and the coupling surface 194b. The tapered surface 194a, the coupling surface 194b, and the rib 194c are obtained by extending the tapered surface 194a, the coupling surface 194b, and the rib 194c of the light guiding member 10, respectively and extend in the AB direction. The rib 194c has a uniform width and a uniform height as a whole and includes a thick gate portion 194g provided at a location. The gate portion 194g is a trace of resin injection for molding the light transmitting member 50. A border line portion 90f between the first transmitting surface S51 and the tapered surface 194a and the border line portion 90g between the third transmitting surface S53 and the coupling surface 194b linearly extend in the AB direction. The border line portions 90f and 90g have small widths in the direction orthogonal to the AB direction in practice in the same manner as the light guiding member 10 and form R planes with arc cross sections.

The tip end portion 196 of the light transmitting member 50 includes, as side portions, a first portion 55a which extends from the first side portion 191 on the lower side and forms an obtuse angle with respect to the first side portion 191 in a front view, a second portion 55b which extends from the second side portion 192 on the upper side and forms a large obtuse angle with respect to the second side portion 192 in the front view, and a third portion 55c which is interposed therebetween and substantially orthogonally intersects both the side portions 191 and 192.

The light guiding member 10 and the light transmitting member 50 are joined between the second surface S12 and the second transmitting surface S52 with the adhesive layer CC interposed therebetween and form the light guiding device 20 as a whole. When the light guiding member 10 and the light transmitting member 50 are joined to each other, it is possible to realize relative alignment in a direction orthogonal to the third surface S13 and the like or the Z direction (see FIG. 5) by pressing a part of the third surface S13 and a part of the third transmitting surface S53 against a first reference surface provided to a jig for alignment, which is not shown in the direction, for example. In addition, it is possible to realize relative alignment in the Y direction (see FIG. 5) by pressing the pair of tapered surfaces 93a and 193a against a second reference surface provided to the jig for alignment. The tapered surfaces 93a and 193a can be reference surfaces which are molded with similar accuracy to that of the first surface S11 and the first transmitting surface S51, and therefore, the light guiding member 10 and the light transmitting member 50 can be joined to each other in a state of being positioned with high accuracy in the Z direction and the Y direction. In addition, for the alignment in the Z direction, it is possible to use the first surface S11 and the first transmitting surface S51 instead of the third surface S13 and the third transmitting surface S53. Similarly, it is possible to use, as reference surfaces for the alignment in the Y direction, the pair of tapered surfaces 94a and 194a or the pair of coupling surfaces 93b and 193b or the like instead of the pair of tapered surfaces 93a and 193a.

Figure 8:
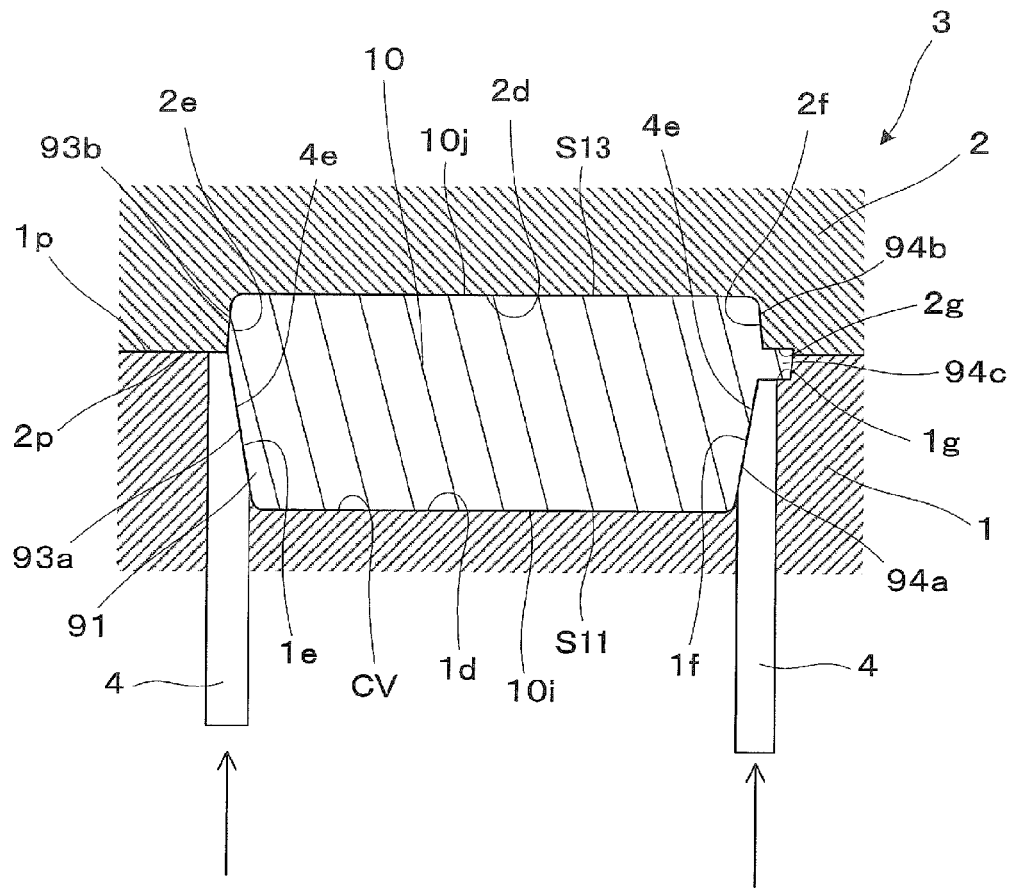
FIG. 8 is a conceptual cross-sectional view illustrating molding of the light guiding member.

FIG. 8 is a diagram illustrating a molding process of the light guiding member 10. The light guiding member 10 is injection-molded by using a molding apparatus 3 provided with a first mold 1 and a second mold 2. By combining the first mold 1 and the second mold 2, split surfaces 1p and 2p are brought into close contact, and a molding space CV is formed. By supplying molten resin to the molding space CV, it is possible to form the light guiding member 10 with a rear surface 10i, to which mold surfaces 1d, 1e, 1f, and 1g of the first mold 1 are transferred, and a front surface 10j, to which mold surfaces 2d, 2e, 2f, and 2g of the second mold 2 are transferred. The mold surface 1d of the first mold 1 corresponds to the first surface S11, the mold surface 1e corresponds to the tapered surface 93a, the mold surface 1f corresponds to the tapered surface 94a, and the mold surface 1g corresponds to the side surface and the like of the rib 94c. That is, the tapered surfaces 93a and 94a and the side surface side and the like of the rib 94c can be formed with similar accuracy to that of the first surface S11. The mold surface 2d of the second mold 2 corresponds to the third surface S13, the mold surface 2e corresponds to the coupling surface 93b, the mold surface 2f corresponds to the coupling surface 94b, and the mold surface 2g corresponds to the side surface and the like of the rib 94c. That is, the coupling surfaces 93b and 94b and the other side surface side and the like of the rib 94c can be formed with similar accuracy to that of the third surface S13.

A plurality of ejector rods 4 for separation are embedded at appropriate positions in the mold surfaces 1e and 1f corresponding to the tapered surfaces 93a and 94a, and a tip end surface 4e of each ejector rod 4 is a continuous tapered surface obtained by extending the peripheral mold surfaces 1e and 1f. In such a case, the tapered surface 93a is pressed with the ejector rods 4. That is, it is possible to extrude the light guiding member 10 as a molded article without requiring the rib on the side of the first side portion 91. In addition, since the shape of the tip end surface 4e of each ejector rod 4 is made to match the shapes of the tapered surfaces 93a and 94a of the light guiding member 10, substantially no traces of the ejector rods 4 remain.

Although not shown in the drawing, the first mold 1 and the second mold 2 are provided with transfer surfaces for molding the second light guiding portion 12 of the light guiding member 10 by transferring.

The light transmitting member 50 is injection-molded by a mold with the same structure as that of the molding apparatus 3 shown in FIG. 8 and with different transfer surface shapes although the description thereof will be omitted.

Figure 9:
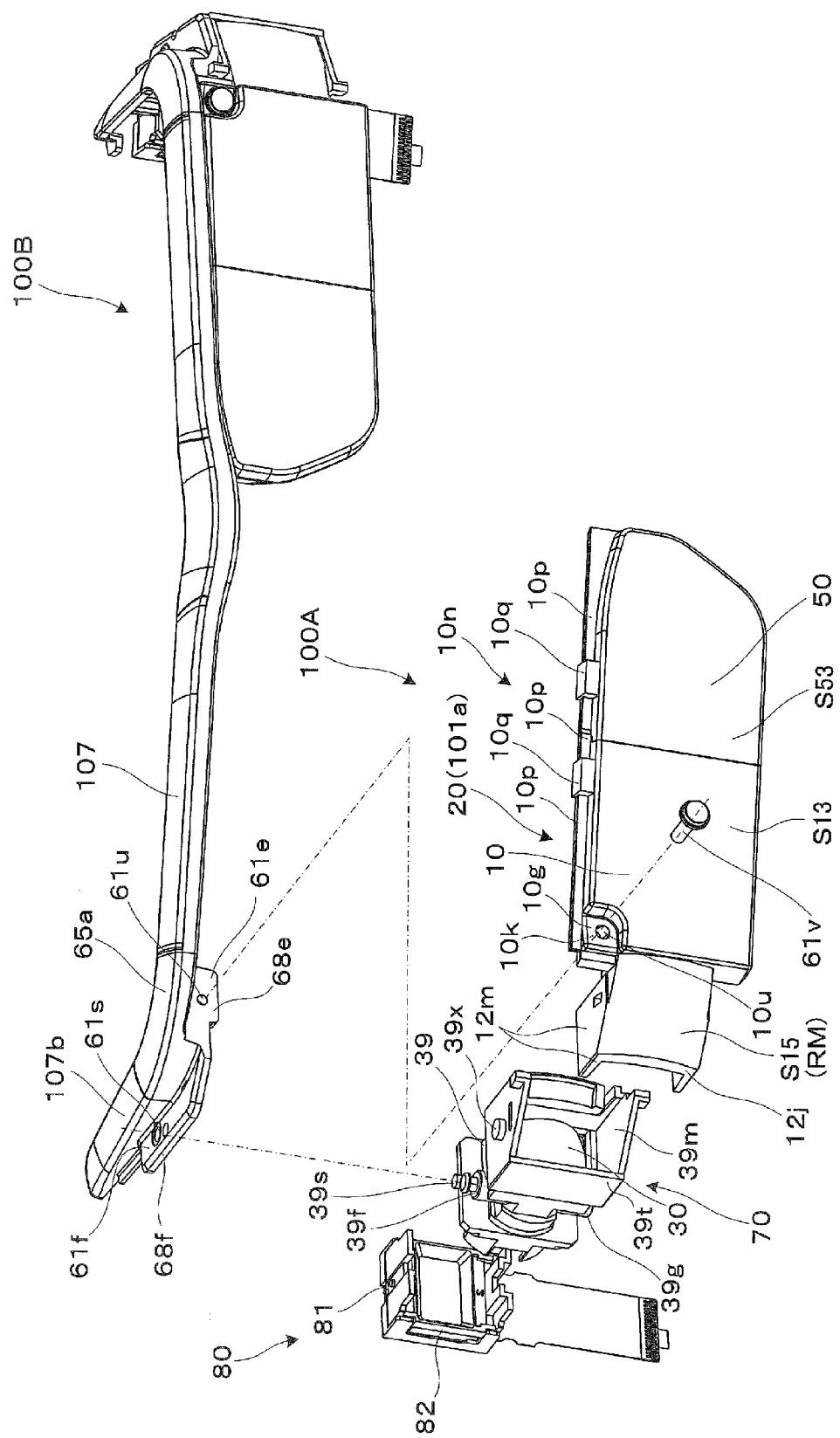
FIG. 9 is an exploded perspective view showing a state where a light guiding device and a projector lens in the virtual image display apparatus are fixed to a frame.

Hereinafter, a description will be given of assembly of the first display device 100A with the frame 107 with reference to FIG. 9. The projector lens 30 which configures the first image formation main body portion 105a is directly fixed to a first fixation portion 61f provided at a side end portion 65a of the frame 107 (a metal portion of the side portion 107b) by using an attachment portion 39g formed so as to be embedded in the lens barrel portion 39 accommodating the projector lens 30. In such fixation, it is possible to achieve the alignment by causing a rear surface 68f of the first fixation portion 61af to abut an upper end surface 39f and the like of the attachment portion 39g and to implement detachable and reliable fixation by screwing a screw 39s into a hole 61s. At this time, a boss 39x provided in the lens barrel portion 39 is fitted into a boss hole (not shown) in the frame 107, rotation of the lens barrel portion 39 is restricted, and positioning with respect to the rotation is performed. In contrast, the light guiding device 20 as the first optical member 101a is directly fixed to a second fixation portion 61e provided at a side end portion 65a of the frame 107 (or a metal portion of the side portion 107b) by using an attachment portion 10g formed at a neck portion or a stepped portion thereof. The attachment portion 10g is provided by using a corner of the first light guiding portion 11 on the incident side of the light guiding device 20 or a portion on the light incident side, specifically in the periphery of the boundary between the first light guiding portion 11 and the second light guiding portion 12. In such fixation, it is possible to achieve alignment by causing an abutting surface 68e provided at a front portion of the second fixation portion 61e to abut a rear surface 10k of the attachment portion 10g, and to implement detachable and reliable fixation by screwing a screw 61v into a screw hole 61u via a screw hole 10u.

The light guiding device 20 is locked in a state of being positioned with respect to the projector lens 30 by causing a tip end portion 12j with a projection shape of the light guiding member 10 on the side of the second light guiding portion 12 to abut an end portion 39t as a locking member with a rectangular frame shape, which is provided on the front end side of the lens barrel portion 39 accommodating the projector lens 30 and opens. That is, when the light guiding member 10 provided in the light guiding device 20 is fixed to the second fixation portion 61e in the frame 107, the tip end portion 12j with a projection shape on the side of the second light guiding portion 12 is inserted so as to be fitted into the end portion 39t of the lens barrel portion 39. At this time, a side surface 12m of the tip end portion 12j abuts an inner surface 39m of the end portion 39t, and the alignment is achieved. The lens barrel portion 39 includes the fitting structure as described above on the side of the end portion 39t and thus functions as the coupling member which couples the projector lens 30 and the light guiding device 20.

Figure 10:
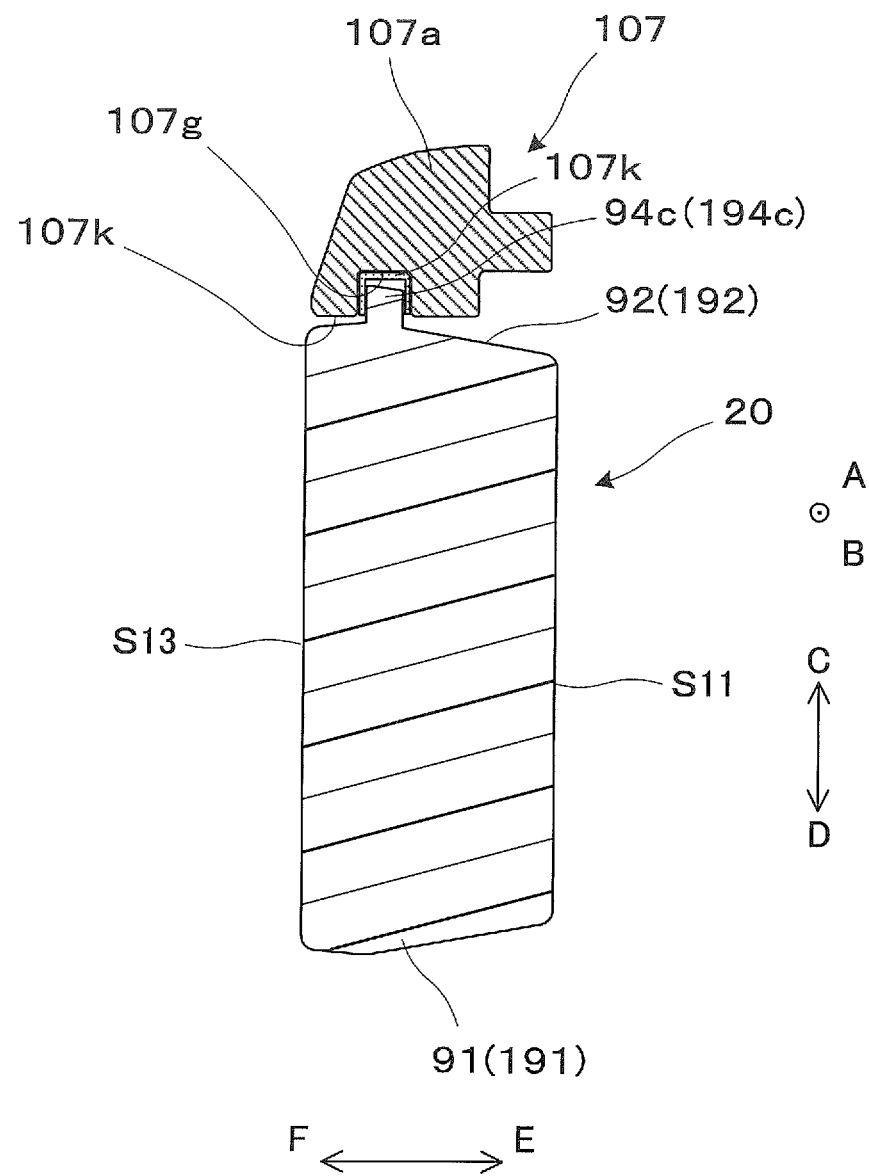
FIG. 10 is a cross-sectional view illustrating support of the light guiding member by the frame.

FIG. 10 is a cross-sectional view illustrating a state where the ribs 94c and 194c of the light guiding device 20 are fitted into a groove 107g provided at the bottom of the front portion 107a of the frame 107 in the frame portion 102. It is possible to attach an elastic member 107k to an inner surface of the groove 107g and to prevent the ribs 94c and 194c from vibrating in the groove 107g. The light guiding device 20 can be slightly displaced in the AB direction, and slight expansion and contraction are allowed. In contrast, the light guiding device 20 cannot be displaced in the front-back EF direction orthogonal to the AB direction, and rotation with respect to the frame 107 is inhibited.

According to the virtual image display apparatus 100 of the embodiment as described above, at least the first side portion 91, which is one of the pair of side portions 91 and 92, couple the pair of facing first and third surfaces S11 and S13 by the tapered surface 93a which is adjacent to the first surface S11 as one of the pair of facing first and third surfaces S11 and S13, and therefore, it is possible to obtain a smooth shape, which does not affect the appearance unlike the rib, for the first side portion 91, to omit post-processing of removing the rib, and to enhance a degree of freedom in designing the appearance.

Other Configurations

Although the invention was described above based on the respective embodiments, the invention is not limited to the aforementioned embodiments and can be implemented in various states without departing from the gist of the invention. For example, the following modifications can be made.

Although the projecting ribs 94c and 194c are provided on the side surface at the second side portion 92 provided on the upper side of the light guiding device 20, it is also possible to omit the ribs 94c and 194c. In such a case, it is possible to use the tapered surfaces 94a and 194a, the third surface S13, and the like to assist holding of the light guiding device 20.

Although the light guiding member 10 includes three non-axisymmetric aspherical surfaces in the above description the invention is not limited thereto. Although the number of non-axisymmetric aspherical surfaces included in the projector lens is assumed to be one, the projector lens can include two or more non-axisymmetric aspherical surfaces.

Although the half mirror layer (semi-transmitting reflective film) 15 is formed in a horizontally elongated rectangular region in the above description, the outline of the half mirror layer 15 can be appropriately modified in accordance with the purpose thereof and other specifications. In addition, the transmittance and the reflection rate of the half mirror layer 15 can be changed in accordance with the purpose thereof and other specifications.

Although distribution of display luminance in the video image display element 82 is not particularly adjusted in the above description, it is possible to irregularly adjust the distribution of the display luminance in a case where a difference occurs in luminance depending on a position.

Although the video image display element 82 configured of a transmissive liquid crystal display device or the like is used as the image display device 80 in the above description, the image display device 80 is not limited to the video image display element 82 configured of the transmissive liquid crystal display device or the like, and various kinds of image display devices can be used. For example, a configuration of using a reflective liquid crystal display device is also applicable, and it is also possible to use a digital micro mirror device or the like instead of the video image display element 82 configured of the liquid crystal display device or the like. In addition, it is also possible to use a self-emitting element, representative examples of which include an LED array and an organic EL (OLED), as the image display device 80.

Although the image display device 80 configured of the transmissive liquid crystal display device or the like is used in the above embodiment, it is also possible to use a scanning-type image display device instead of the transmissive liquid crystal display device.

In addition, although the above embodiment employs the configuration in which the light guiding member 10 and the light transmitting member 50 as the assistant optical block cover the entirety of the front side of the eyes EY of the wearer thereof, the invention is not limited thereto. A configuration in which a part including the second surface S12 with the spherical surface including the half mirror layer 15 covers apart of the eyes EY, namely a small-sized configuration in which a part of the front side of the eyes is covered and an uncovered part is also present is also applicable.

Although the above description is about the virtual image display apparatus 100 provided with the pair of display devices 100A and 100B, the virtual image display apparatus can be implemented as a single display device. That is, a configuration in which an image is viewed by one eye by providing the perspective projection device 70 and the image display device 80 only for one of the right eye or the left eye instead of providing a pair of the perspective projection devices 70 and the image display device 80 for each of the right eye and the left eye.

Although the half mirror layer 15 is a simple semi-transmitting film (for example, a metal reflective film or a dielectric body multilayered film) in the above description, the half mirror layer 15 can be replaced with a planar or spherical hologram element.

Although the light guiding member 10 and the like extend in the traverse direction in which the eyes EY are aligned in the above description, the light guiding member 10 can be arranged so as to extend in a longitudinal direction. In such a case, the light guiding member 10 has a structure of being arranged in parallel not in series.

The entire disclosure of Japanese Patent Application NO. 2013-268721, filed Dec. 26, 2013 is expressly incorporated by reference herein.

What is claimed is:

1. A virtual image display apparatus comprising:
a video image element which generates video image light; and
a light guiding member which includes a plurality of optical surfaces and guides the video image light from the video image element by reflecting the video image light by inner surfaces,
wherein the light guiding member is a member which includes, as the plurality of optical surfaces, a pair of facing planes arranged substantially in parallel with each other and fully reflecting the video image light,
wherein the light guiding member includes a pair of side portions interposing the pair of facing planes from a direction vertical to a light guiding direction in which the video image light is guided,
wherein at least one side portion of the pair of side portions includes a tapered surface which is adjacent to one of the pair of facing planes and forms an obtuse angle, and
wherein the one side portion includes a flat band-shaped coupling surface between the tapered surface and the other surface of the pair of facing planes.

2. The virtual image display apparatus according to claim 1,
wherein the one side portion couples the pair of facing planes by a flat surface including the tapered surface.

3. The virtual image display apparatus according to claim 1, wherein the flat band-shaped coupling surface is adjacent to the other plane of the pair of facing planes and forms an obtuse angle.

4. The virtual image display apparatus according to claim 1,
wherein the light guiding member extends in a thin and elongated shape in the light guiding direction, and the tapered surface at the one side portion also extends in a thin and elongated shape in the light guiding direction.

5. The virtual image display apparatus according to claim 1,
wherein the other side portion of the pair of side portions includes a tapered surface which is adjacent to the one plane of the pair of facing planes and forms an obtuse angle and a rib which is formed and projected on the side closer to the other plane of the pair of facing planes than to the tapered surface.

6. The virtual image display apparatus according to claim 5, further comprising:
a frame portion which supports the light guiding member in front of the eyes,
wherein the rib is fitted into a groove which is provided in the frame portion.

7. The virtual image display apparatus according to claim 5,
wherein the pair of tapered surfaces provided at the pair of side portions form an angle from 91° to 135° with respect to the one plane.

8. The virtual image display apparatus according to claim 1,
wherein the light guiding member includes a light incident surface, from which the video image light from the video image element is taken, at one end in the light guiding direction and emits the video image light from the one plane of the pair of facing planes.

9. The virtual image display apparatus according to claim 1,
wherein the light guiding member includes four or more surfaces as the plurality of optical surfaces,
wherein the video image light from the video image element is fully reflected by a third surface as the other plane of the pair of facing planes, is fully reflected by a first surface as the one plane of the pair of facing planes, is reflected by a second surface, then transmits through the first surface, and reaches a viewing side.

10. The virtual image display apparatus according to claim 9, further comprising:

a light transmitting member which causes a viewer to visually recognize external light and the video image light in an overlapped manner by being attached to the second surface of the light guiding member.

11. The virtual image display apparatus according to claim 1, wherein the tapered surface extends along a plane from a bottom of the pair of side portions such that the pair of facing planes have angled sides defining a variable width of the pair of facing planes.

12. The virtual image display apparatus according to claim 1, wherein the tapered surface extends along a plane from a bottom of the pair of side portions such that the pair of facing planes have angled sides defining an increasing width from the bottom of the pair of facing planes.

13. The virtual image display apparatus according to claim 1, wherein the side portion includes a coupling surface between the tapered surface and the other surface of the pair of facing planes, the tapered surface having a width that is substantially larger than a width of the coupling surface.

14. The virtual image display apparatus according to claim 1, wherein the tapered surface defines a reference surface complementary to a reference surface of a jig.

* * * * *